No. 854,635. PATENTED MAY 21, 1907.
C. DUERST.
FAUCET.
APPLICATION FILED FEB. 16, 1907.
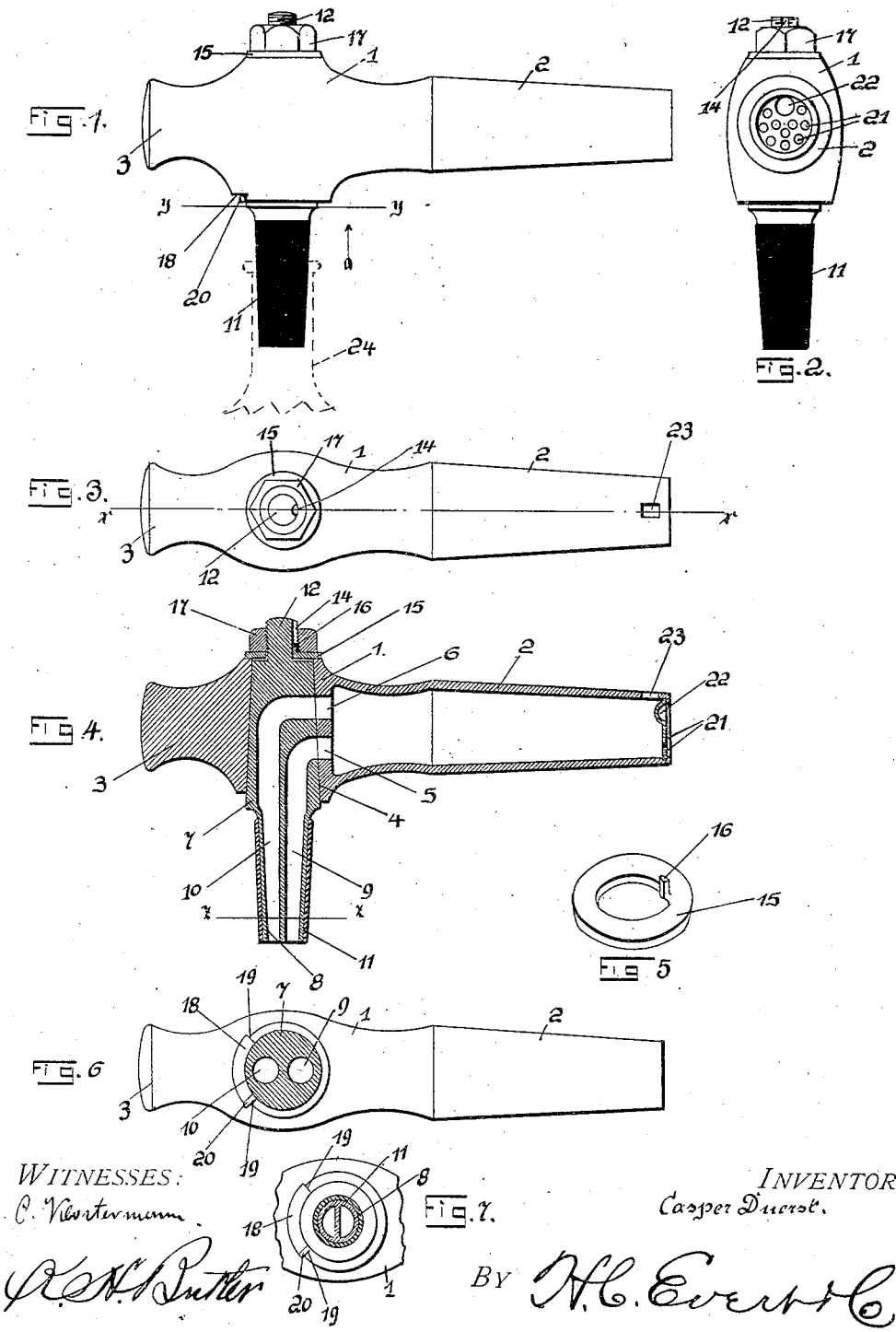
WITNESSES:
C. Vlostermann
R. H. Butler
INVENTOR
Casper Duerst.
By H. C. Everts & Co.
Attorneys

UNITED STATES PATENT OFFICE.

CASPER DUERST, OF BELLEVUE, PENNSYLVANIA.

FAUCET.

No. 854,635.  Specification of Letters Patent.  Patented May 21, 1907.

Application filed February 16, 1907. Serial No. 357,737.

*To all whom it may concern:*

Be it known that I, CASPER DUERST, a citizen of the United States of America, residing at Bellevue, in the county of Allegheny and State of Pennsylvania, have invented certain new and useful Improvements in Faucets, of which the following is a specification, reference being had therein to the accompanying drawings.

This invention relates to faucets, and the invention has for its object to provide a faucet having a novel valve that can be easily controlled.

My invention aims to provide a faucet or spigot for filling receptacles, the receptacles being placed in engagement with the faucet or spigot to serve functionally as a handle or lever in manipulating the valve of the faucet or spigot. To this end, I have designed a faucet or spigot particularly adapted for beer kegs and barrels, the faucet or spigot being used to tap the same.

In connection with my improved faucet or spigot I employ novel means for retaining the carbonic acid gas in the keg or barrel, thus maintaining the contents of the keg or barrel in a better condition than if this gas was permitted to escape.

With the above and other objects in view, which will more readily appear as the invention is better understood, the same consists in the novel construction, combination and arrangement of parts to be hereinafter more fully described and then specifically pointed out in the appended claims, and referring to the drawing forming part of this specification, like numerals of reference designate corresponding parts throughout the several views, in which:—

Figure 1 is a side elevation of my improved faucet or spigot, Fig. 2 is an end view of the same, Fig. 3 is a plan, Fig. 4 is a vertical sectional view taken on the line $x$—$x$ of Fig. 3, Fig. 5 is a detail perspective view of a locking ring used in connection with the faucet or spigot, Fig. 6 is a horizontal sectional view taken on the line $y$—$y$ of Fig. 1, looking in the direction of the arrow of said figure, Fig. 7 is a horizontal sectional view taken on the line $z$—$z$ of Fig. 4.

To put my invention into practice, I construct my improved faucet or spigot of a body portion 1 having a tapering hollow stem 2 and a hammer head 3, said head being used when the faucet or spigot is driven into a keg or barrel. The body 1 is provided with an upwardly tapering valve socket 4, which communicates with the hollow stem 2, through the medium of openings 5 and 6, said openings being arranged one above the other.

In the socket 4 of the valve body 1 is mounted a valve 7 adapted to snugly fit within said socket. The valve is formed with a tapering contracted shank 8 having two bores 9 and 10 formed therein, which communicate with the openings 5 and 6 respectively. Mounted upon the tapering contracted shank 8 is a resilient sleeve 11 preferably constructed of rubber.

To retain the tapering valve 7 within its socket, the valve is formed at its upper end with a contracted threaded stem 12 having a vertically disposed groove 14 formed therein. Fitting over the stem 12 is a washer or collar 15 having an upwardly extending prong 16 adapted to engage in the groove 14 of said stem. The collar or washer 15 rests upon the top of the body 1 and is retained therein and in engagement with the stem 12 by a nut 17 threaded upon said stem.

To limit the revoluble movement of the valve, I cut away the faucet body 1, as at 18, to provide two shoulders 19, and adapted to engage said shoulders is a pin 20 carried by the valve 7.

The end of the hollow stem 2 is partially closed the same being provided with a perforated plate 21 having its upper edge formed with an indentation 22, which serves functionally as a deflector, for deflecting air or gas through an opening 23 formed upon the upper side of the hollow stem 2. After the faucet or spigot has been driven into a barrel or keg, a bottle 24 or similar receptacle is placed in frictional engagement with the sleeve 11 of the shank 8. The bottle or receptacle is then used as a handle or lever to rotate the valve 7 and place the bores 9 and 10 in communication with the openings 5 and 6 respectively. The contents of the barrel are adapted to enter the perforations of the plate 21, pass through the hollow stem 2 to the opening 5 and through bore 9 to the bottle 24. The bore 10 and the opening 6 are employed for allowing the air and gas to escape from the bottle 24, through the hollow stem 2 and the opening 23 into the keg or barrel, the indentation 22 serving to deflect the air and gas upwardly into the opening 23.

From the foregoing description taken in connection with the drawings, it will be observed that the valve 7 can be easily and quickly manipulated either to place the bores 9 and 10 in communication with the openings 5 and 6 or to close said openings. The pin 20 limits the rotative movement which may be imparted to the valve 7, the said pin engaging one of the shoulders 19 when the valve has been turned so as to bring ports 9 and 10 in communication with ports 5 and 6, and when the valve is turned so as to engage the pin 20 with the other shoulder 19, the ports 5 and 6 have passed entirely out of communication with ports 5 and 6, and the valve is closed.

The novel construction of the faucet or spigot permits of the same being easily and quickly cleansed, and while I have herein described the same as being particularly designed for beer kegs, and barrels, it is obvious that the faucet or spigot can be constructed for other purposes.

Such changes in the size, proportion and minor details of construction as are permissible by the appended claims, may be resorted to without departing from the spirit and scope of the invention.

What I claim and desire to secure by Letters Patent, is:—

1. A faucet or spigot consisting of a body having a hollow tapering stem, a hammer head carried by said faucet body, said hollow stem having an opening formed adjacent to its end, a perforated plate mounted in the end of said stem and having an indentation for deflecting air or gas through said opening, said faucet body having a valve socket formed therein, a valve mounted in said socket and having a tapering shank, a resilient sleeve mounted upon said shank, said valve and shank having bores formed therein adapted to communicate with said hollow stem, means to retain said valve within said socket, and means to limit the movement of said valve within said socket.

2. A faucet or spigot consisting of a body having a socket formed therein, a hollow stem carried by said body, and communicating with said socket, said stem having an opening formed therein, a perforated plate mounted in the end of said stem and having an indentation for deflecting air or gas through said opening, a valve mounted in the socket of said faucet body and having a tapering shank, a resilient sleeve mounted upon said shank, said valve and shank having bores formed therein adapted to communicate with said hollow stem, means to retain said valve in said socket, and means to limit the movement of said valve within said socket.

In testimony whereof I affix my signature in the presence of two witnesses.

CASPER DUERST.

Witnesses:
PAUL WENZIG,
KARL GETTNER.